United States Patent
Shibata

(10) Patent No.: US 7,557,943 B2
(45) Date of Patent: Jul. 7, 2009

(54) IMAGE DATA MANAGEMENT METHOD OF MULTIPLE SETS OF IMAGE DATA

(75) Inventor: Koichi Shibata, Sakai (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 278 days.

(21) Appl. No.: 10/161,643

(22) Filed: Jun. 5, 2002

(65) Prior Publication Data

US 2002/0184249 A1   Dec. 5, 2002

(30) Foreign Application Priority Data

Jun. 5, 2001   (JP)   .............................. 2001-169245

(51) Int. Cl.
G06F 3/12   (2006.01)

(52) U.S. Cl. ...................... 358/1.15; 358/474; 358/448; 358/403; 358/402; 358/400; 707/204; 715/837; 715/775

(58) Field of Classification Search ............... 358/1.15, 358/400, 440, 434, 1.6, 1.12, 474, 494, 1.2; 707/204; 715/837, 775, 839
See application file for complete search history.

(56) References Cited

U.S. PATENT DOCUMENTS

| | | | | |
|---|---|---|---|---|
| 5,388,196 A | * | 2/1995 | Pajak et al. | ............... 715/751 |
| 5,862,325 A | * | 1/1999 | Reed et al. | ............... 709/201 |
| 6,088,717 A | * | 7/2000 | Reed et al. | ............... 709/201 |
| 6,512,599 B1 | * | 1/2003 | Hattori | ............... 358/442 |
| 6,594,650 B2 | * | 7/2003 | Hasuo et al. | ............... 707/2 |
| 6,643,028 B1 | * | 11/2003 | Ogaki et al. | ............... 358/1.6 |
| 6,775,238 B1 | * | 8/2004 | Suzuki | ............... 370/242 |
| 6,982,811 B2 | * | 1/2006 | Sato | ............... 358/1.4 |
| 7,139,102 B2 | * | 11/2006 | Minato | ............... 358/3.07 |
| 7,376,680 B1 | * | 5/2008 | Kettler et al. | ............... 707/205 |
| 2002/0027675 A1 | * | 3/2002 | Minato | ............... 358/1.15 |

FOREIGN PATENT DOCUMENTS

| | | |
|---|---|---|
| JP | A-2000-151887 | 5/2000 |
| JP | A-2000-151888 | 5/2000 |
| JP | 2001-61026 A | 3/2001 |
| JP | 2001-136356 A | 5/2001 |

OTHER PUBLICATIONS

Japanese Office Action dated Jun. 17, 2008, with English-Language translation.

* cited by examiner

*Primary Examiner*—Negussie Worku
(74) *Attorney, Agent, or Firm*—Buchanan Ingersoll & Rooney PC

(57) ABSTRACT

An image reading apparatus reads a multi-page original document and obtains multiple sets of image data, creates virtual combination information that indicates the interrelationships among the obtained multiple sets of image data, separately sends the obtained multiple sets of image data and sends the virtual combination information. Consequently, the computer that received the multiple sets of image data and the virtual combination information can recognize the received multiple sets of image data as separate sets of image data, while associating the received multiple sets of image data with one another.

12 Claims, 8 Drawing Sheets

| Virtual Combination File Name : report | |
|---|---|
| Order | File Name |
| 1 | 001.tif |
| 2 | 002.tif |
| 3 | 003.tif |
| 4 | 004.tif |
| 5 | 005.tif |

| Group | Original Documents | Report File | |
|---|---|---|---|
| | | File Name | Order |
| 1 |  | 001.tif (3 pages) | 1 |
| 2 |  | 002.tif (2 pages) | 2 |
| 3 |  | 003.tif (1 page) | 3 |
| 4 |  | 004.tif (3 pages) | 4 |
| 5 |  | 005.tif (2 pages) | 5 |

Fig. 9

| Group | Original Documents | Report File | | |
|---|---|---|---|---|
| | | File Name | Order | identification |
| 1 | | 001.tif<br>002.tif<br>003.tif | 1<br>2<br>3 | technical memo<br>technical memo<br>technical memo |
| 2 | | 004.tif<br>005.tif | 4<br>5 | specification<br>specification |

IMAGE DATA MANAGEMENT METHOD OF MULTIPLE SETS OF IMAGE DATA

This application is based on application No. 2001-169245 filed in Japan, the content of which is hereby incorporated by reference.

BACKGROUND OF THE INVENTION

1. Field of the Invention

The present invention relates to an image reading apparatus, an image transmission method, an image transmission program, and a computer-readable recording medium on which the image transmission program is recorded, and more particularly, to an image reading apparatus, image transmission method and image transmission program that include a function to send multiple sets of image data obtained through the reading of a multi-page original document, as well as to a computer-readable recording medium on which the image transmission program is recorded. The present invention also relates to an image management apparatus, an image management method, an image management program and a computer-readable recording medium on which the image management program is recorded, as well as an image management apparatus, image management method, and image management program that include a function to receive multiple sets of image data sent from an image reading apparatus, as well to as a computer-readable recording medium on which the image management program is recorded.

2. Description of the Related Art

In the conventional art, an image reading apparatus such as an image scanner reads an original document placed on the image reading unit thereof, converts the original document image into image data as digital data, and transmits such data to an information processing apparatus such as a personal computer that is connected to the image reading apparatus directly or over a network. Upon receiving the image data, the information processing apparatus can display it on the display or carry out certain image processing to the received image data. The image data is recorded in a magnetic recording device or other means included in the information processing apparatus.

However, using a conventional image reading apparatus, when the original document is read while being placed on the platen one page at a time by the user, the image data obtained through reading is generated as one image data file for each page of the original document, and when this data file is sent to the information processing apparatus, the information processing apparatus records the image data file each time one is received. Therefore, where original documents that includes multiple document sets each including multiple pages is read by the image reading apparatus one page at a time and the image thereof is sent to the information processing apparatus, the information processing apparatus that receives the image data files cannot determine whether the multiple image data files, each of which includes an image file for one page of the original document, should be managed as one group or as multiple different groups. Accordingly, the user of the information processing apparatus must either change a part of the file name for each of the multiple image data files received such that the same name is included in files belonging to the same document set, or save the received multiple image data files in different folders depending on the document set to which the file belongs. As a result, the user of the information processing apparatus is required to perform some operation.

In an image reading apparatus that includes an automatic document feeder (ADF) that conveys each page of a multi-page original document to the image reading unit, because the multiple pages of the original document set in the ADF are read continuously, the multiple sets of image data obtained through the reading of the multi-page original document are placed into a single image data file, such as a multi-page TIFF file, for example, and sent to the information processing apparatus. Therefore, the information processing apparatus handles all of the original document images as one image data file. Consequently, even if it is desired to manage the multi-page original document as multiple different document sets, if the original document is placed in the ADF all at once, all of the original document image data is deemed to belong to a single file. Accordingly, where an original document that includes multiple document sets was to be read and the image data thereof is sent to the same information processing apparatus, in the conventional art the original document must be divided into each document set, which was then read, and the image data for each document set had to be transmitted as one image data file each time such reading was performed. However, as a result, it was difficult for the information processing apparatus to recognize the relationships among the received multiple files, as described above.

SUMMARY OF THE INVENTION

The present invention is created in order to resolve these problems, and an object thereof is to provide an image reading apparatus, image transmission method and image transmission program capable of sending multiple sets of image data obtained through the reading of a multi-page original document while associating them with one another, as well as a computer-readable recording medium on which such image transmission program is recorded.

Another object of the present invention is to provide an image management apparatus, image management method and image management program capable of recognizing multiple sets of image data as separate sets of image data and managing multiple sets of image data by page, as well as a computer-readable recording medium on which such image management program is recorded.

According to one aspect of the present invention, an image reading apparatus, comprises an image reader for reading a multi-page original document and obtaining multiple sets of image data; a file creating portion for creating multiple image data files from the read image data sets; a management information creating portion for creating management information that indicates interrelationships among the multiple image data files; a first transmission portion for sending the multiple image data files to an external apparatus; and a second transmission portion for sending the management information.

BRIEF DESCRIPTION OF THE DRAWINGS

These and other objects and features of this invention will become clear from the following description, taken in conjunction with the preferred embodiments with reference to the accompanied drawings in which:

FIG. 9 is an explanatory drawing showing the concept of the image data management pertaining to another embodiment.

DETAILED DESCRIPTION OF THE PREFERRED EMBODIMENTS

Figure 1:
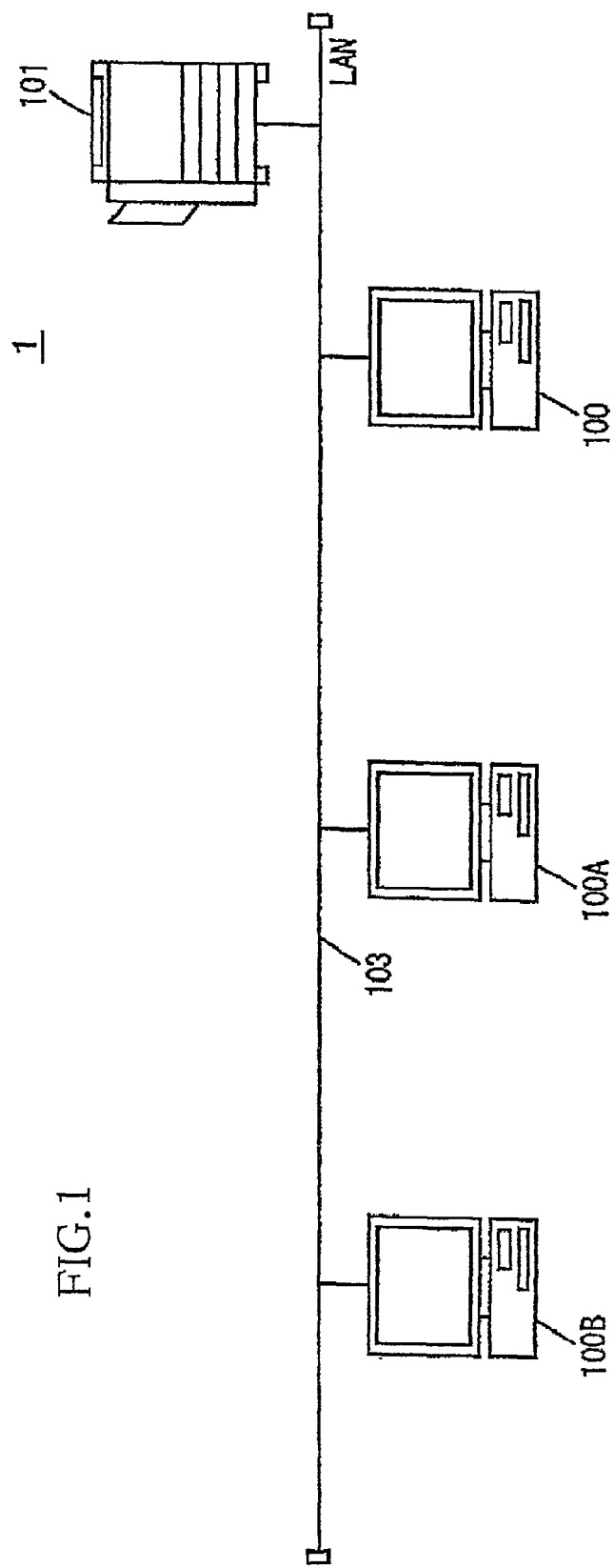
FIG. 1 is a drawing showing the outline of a file management system pertaining to one embodiment of the present invention.

A file management system pertaining to one embodiment of the present invention is explained below. In the drawings, identical numbers indicate identical or equivalent members, and explanations will not be duplicated.

FIG. 1 is a drawing showing the outline of a file management system pertaining to one embodiment of the present invention. With reference to FIG. 1, the file management system 1 includes image management apparatuses 100, 100A and 100B and a copying machine 101.

The image management apparatuses 100, 100A and 100B and the copying machine 101 are each connected to a local area network (LAN) 103. The image management apparatuses 100, 100A and 100B can communicate with the copying machine 101 over the LAN 103.

In this embodiment, an explanation will be provided using a copying machine as an example of the image reading apparatus, but the image reading apparatus may be a facsimile or image reader including an image reading apparatus, or a multi-function machine which is a combination thereof.

In addition, in this embodiment, a configuration in which one copying machine 101 and three image management apparatuses 100, 100A and 100B are connected to the LAN 103 is shown, but the numbers of these machines are not limited to these numbers. With regard to this embodiment, a situation in which image data obtained through the reading of an original document by the copying machine 101 is sent to the image management apparatus 100 will be explained as an example.

Figure 2:
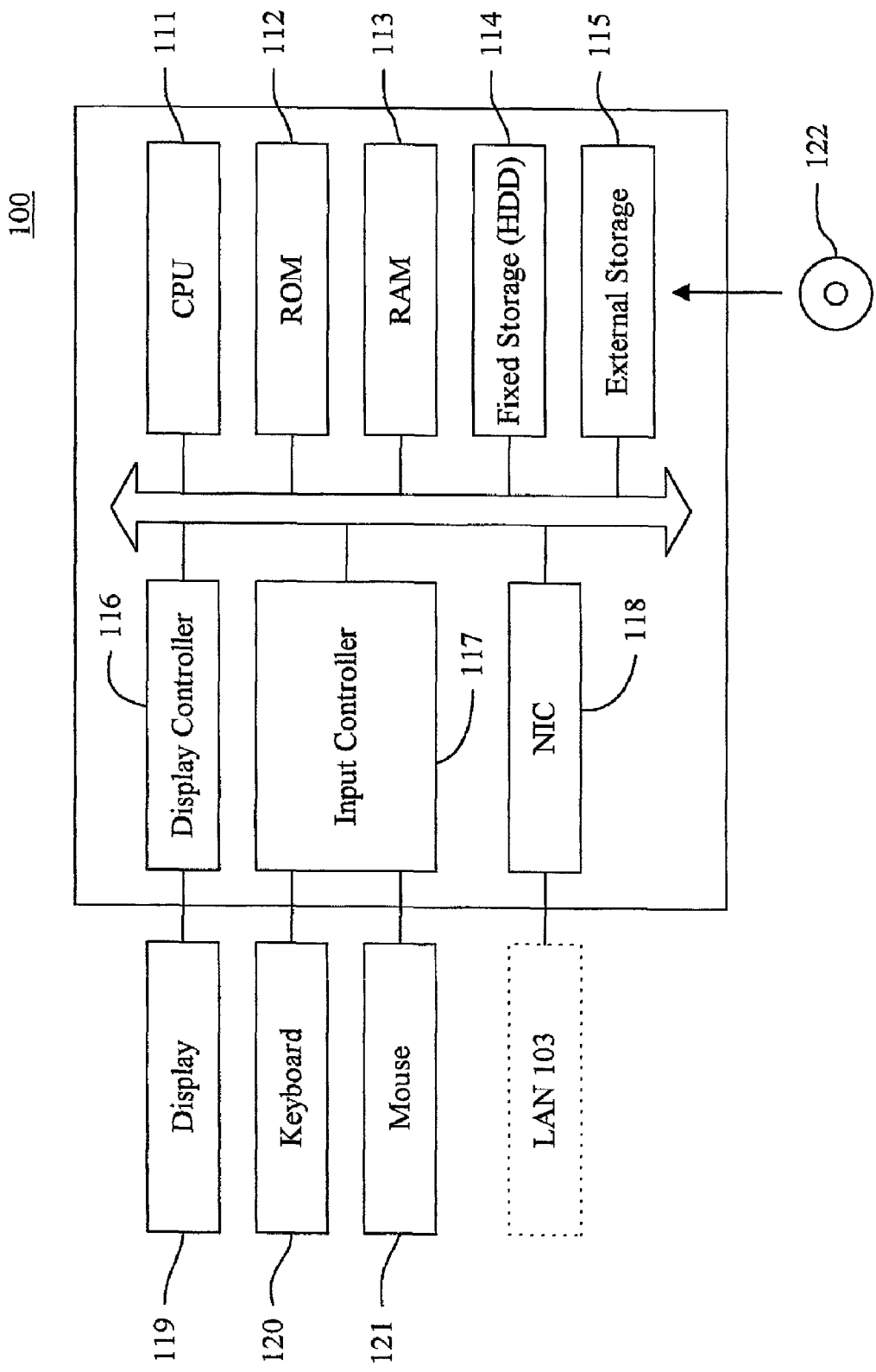
FIG. 2 is a block diagram showing the basic construction of the image management apparatus of the file management system pertaining to the embodiment.

FIG. 2 is a block diagram showing the basic construction of the image management apparatus 100 of the file management system 1 pertaining to this embodiment. The image management apparatus 100 is a personal computer or the like. With reference to FIG. 2, the image management apparatus 100 includes a central processing unit (CPU) 111 to control the entire image management apparatus 100, a read-only memory (ROM) 112 to store programs executed by the CPU 111, a random access memory (RAM) 113 used as a work area when the CPU 111 executes a program, a fixed storage device 114 such as a magnetic disk device, an external storage device 115, a display controller 116, an input controller 117, and a network interface card (NIC) 118 to connect the image management apparatus 100 to the LAN 103.

The fixed storage device 114 may be a magnetic disk device such as a hard disk drive. The fixed storage device 114 is capable of storing programs executed by the CPU 111, image data and virtual combination information, etc. received from the copying machine 101. The fixed storage device 114 also stores information regarding the copying machine 101. The information regarding the copying machine 101 includes network addresses such as the IP (Internet Protocol) address supplied to the copying machine 101. Furthermore, the fixed storage device 114 also stores programs to expand image data that is compressed via compression processing, an application program to display image data and other programs.

The external storage device 115 reads the programs and data stored on a computer-readable recording medium 122, and sends them to the CPU 111. It also writes necessary data to the computer-readable recording medium 122 in accordance with instructions from the CPU 111.

The computer-readable recording medium 122 is a medium that carries programs in a fixed fashion, and that may be a tape such as a magnetic tape or cassette tape, a disk such as a magnetic disk (flexible disk, hard disk, etc.) or optical disk (CD-ROM, MO, MD, DVD, etc.), a card such as an IC card (including a memory card) or optical card, a mask ROM, an EPROM or a semiconductor memory such as a flash memory.

The recording medium 122 may also be a recording medium that carries programs in a fluid fashion, such as where the programs can be downloaded from the network. The external storage device 115 is constructed such that it can read the programs and data stored on such recording medium 122 or write data thereto.

The display controller 116 is connected to the display 119, and displays such information as characters and graphics on the display 119 in accordance with instructions from the CPU 111. The input controller 117 is connected to the keyboard 120 and mouse 121. The information input from the keyboard 120 or mouse 121 is sent to the CPU 111.

The NIC 118 connects the image management apparatus 100 to the LAN 103. Due to this connection, the image management apparatus 100 can communicate with the copying machine 100 over the LAN 103.

Figure 3:
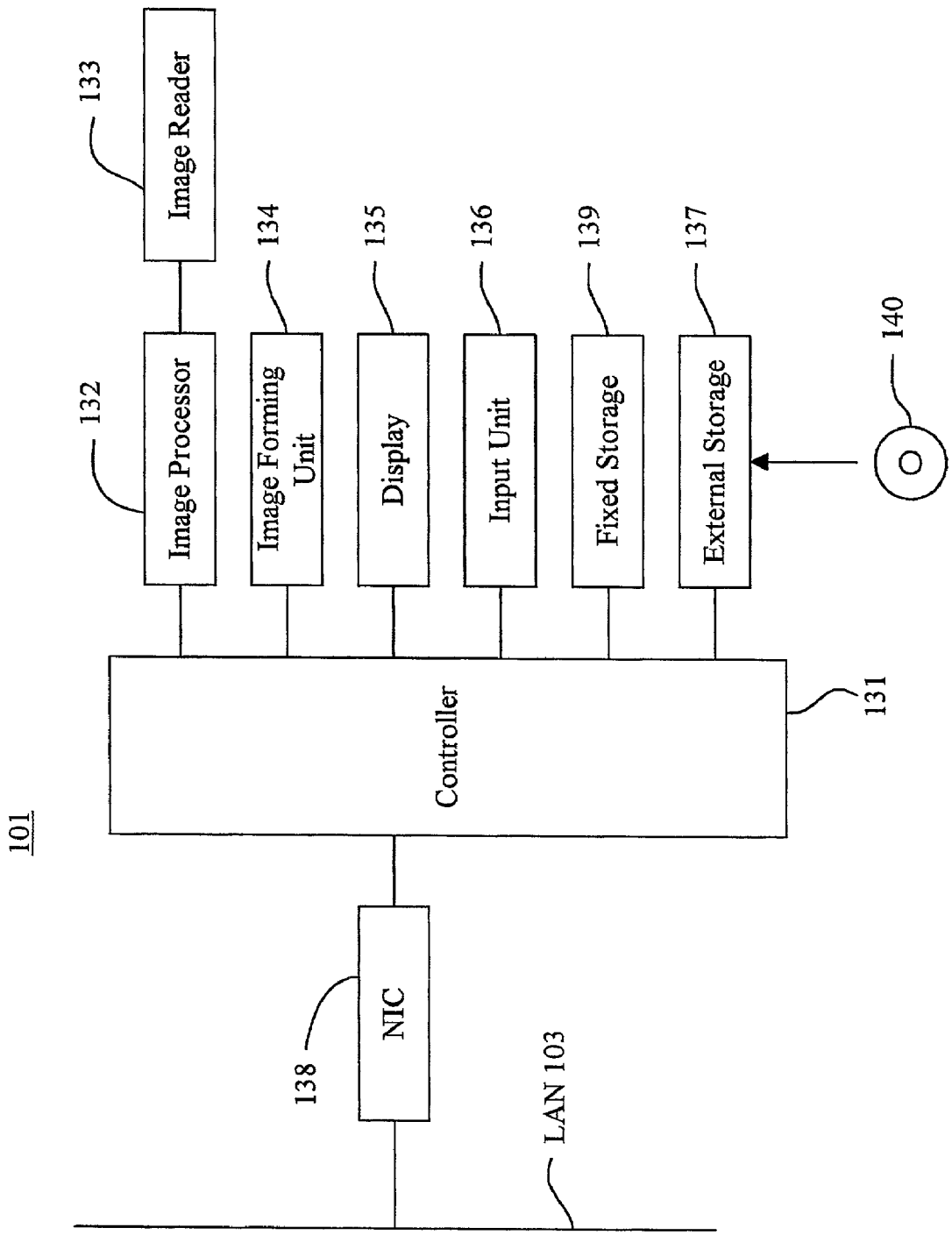
FIG. 3 is a block diagram showing the basic construction of the copying machine of the file management system pertaining to the embodiment.

FIG. 3 is a block diagram showing the basic construction of the copying machine of the file management system of this embodiment. With reference to FIG. 3, the copying machine 101 includes a controller 131 to control the entire copying machine 101, an image reader 133 to read the original document, an image processor 132 to process the image data output by the image reader 133, an image forming unit 134 to form an image on a recording medium such as paper based on the image data that has undergone image processing, a display 135 to display necessary information, an input unit 136 to input necessary instructions to the copying machine 101, a network interface card (NIC) 138 to connect the copying machine 101 to the LAN 103, a fixed storage device 139 to store the programs executed by the controller 131 and prescribed information, and an external storage device 137.

The controller 131 includes a central processing unit (CPU) to execute programs, a ROM to store the programs executed by the CPU, and a RAM that is used as a memory area necessary when a program is executed by the CPU.

The image reader 133 irradiates light onto the original document, which is the object of reading, and receives the reflected light using a photoelectric conversion element such as a charge-coupled device (CCD). The received light is converted into electric signals, which are then sent to the image processor 132 as image data.

The image reader 133 also includes an automatic document feeder. When a print instruction is issued, the automatic document feeder automatically sets the original document, which includes multiple pages and is placed in the original document supply tray, in the reading position beginning with the bottom page thereof, and when reading at the reading position is completed, the original document page is ejected to an eject tray. Therefore, the user can have all of the multiple pages of the original document read simply by issuing a print instruction after placing the original document in the automatic document feeder while ensuring that the pages are stacked together and the first page is placed at the bottom.

The image processor 132 performs correction routines such as noise removal and color correction or image compression that reduces the data amount for transmission purposes with regard to the image data received from the image reader 133, or with regard to the image data received from a personal computer or the like via the NIC 138 and the LAN 103. The image data is then stored as an image file having a prescribed file format. The image data processed by the image processor 132 is sent to the image forming unit 134 or the NIC 138.

The image data sent to the NIC 138 may be subjected to compression such as image compression by the image processor 132. The programs that executes image compression are stored in the fixed storage device 139, and are read out to the image processor 132 and executed where necessary.

The image forming unit 134 forms an image on a recording medium such as a sheet of paper using the image data received from the image processor 132.

The fixed storage device 139 stores the programs executed by the controller 131, the IP address of the image management apparatus 100 connected to the LAN 103, the image compression programs corresponding to multiple compression format, etc.

The input unit 136 has a numeric keypad, a touch panel or other devices, and is used to input to the copying machine 101 necessary instructions such as the parameters for reading of the original document. In this embodiment, an input regarding whether to copy the image data obtained through the reading of the original document by the copying machine 101 or to send such image data to the image management apparatus 100 over the LAN 103 is also performed.

The display 135 is a liquid crystal display device, and displays menu screens from which to set the operation mode for the copying machine 101, the operation mode to which the copying machine 101 is set, and other information.

The NIC 138 is an interface to connect the copying machine 101 to the LAN 103. The copying machine 101 can communicate with the image management apparatus 100 via the NIC 138. The NIC 138 can also connect to an external personal computer and public telephone lines. The NIC 138 includes mainly a communication controller that performs communication control for the transmission and receipt of control signals and image data to and from the personal computer, a network controller that performs network control for the transmission and receipt via the LAN of control signals and image data to and from an external device connected to the LAN, a facsimile converter that transmits and receives data to and from the controller 131 and performs conversion of the image density and compression format when the copying machine 101 functions as a facsimile, and a G3 unit that performs communication control such as modulation and demodulation of the image data and of control signals when the copying machine 101 functions as a facsimile, as well as communication control over communication with a PSTN connected to telephone lines.

The external storage device 137 reads the programs and data stored in the computer-readable recording medium 140 and sends them to the controller 131. It also writes necessary data to a computer-readable recording medium 140 in accordance with instructions from the controller 131. The computer-readable recording medium 140 may have any of the media that is the recording medium 122 described above.

The situation in which the image data obtained by the copying machine 101 through the reading of the original document is sent to the image management apparatus 100 over the LAN 103 will now be explained.

Figure 4:
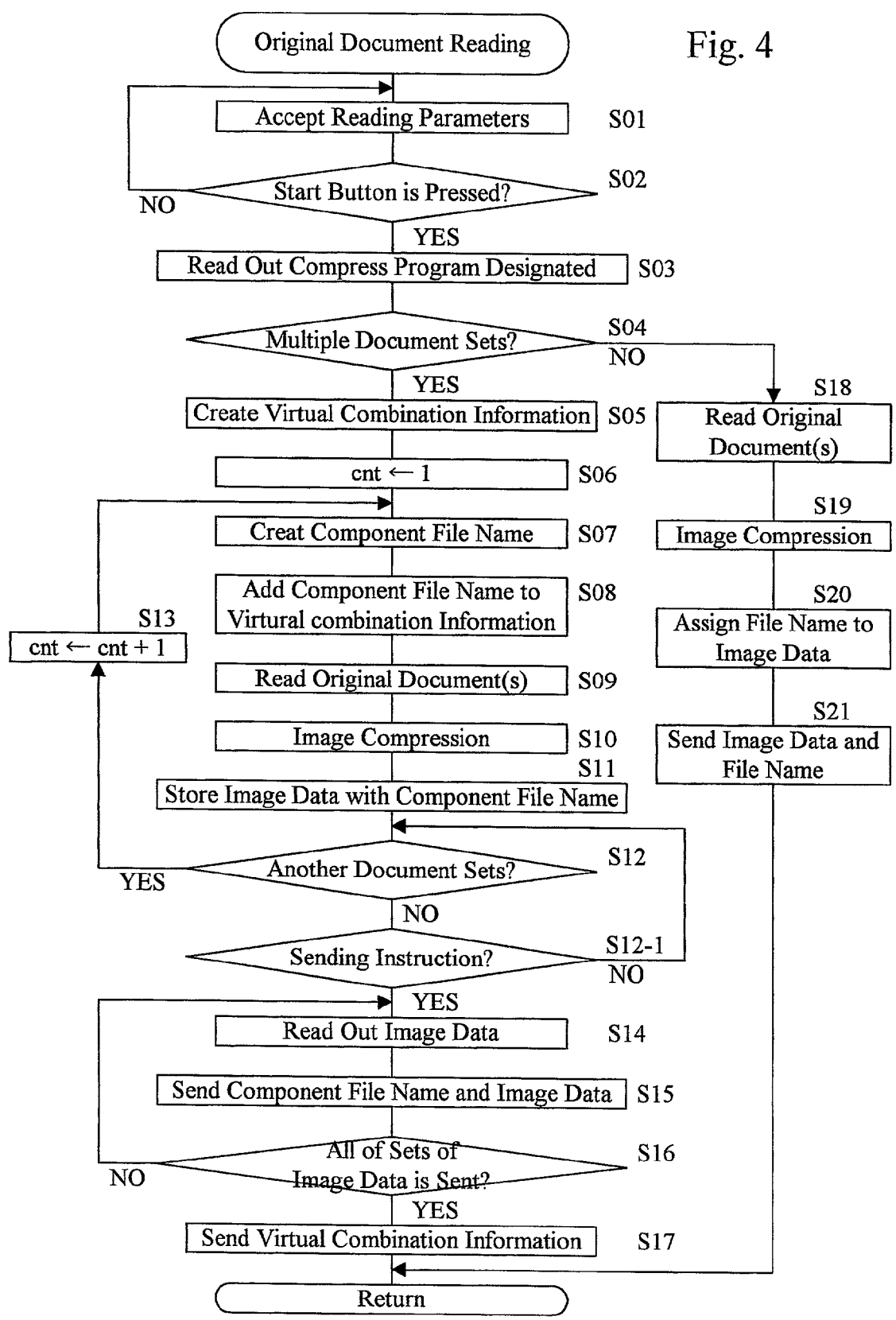
FIG. 4 is a flow chart showing the sequence of the original document reading routine performed by the copying machine 101 of this embodiment.

FIG. 4 is a flow chart showing the sequence of the original document reading routine executed by the copying machine 101 of this embodiment. Referring to FIG. 4, in the original document reading routine, settings for the reading parameters are first accepted (step S01). The settings input by the user via the input unit 136 are accepted as the settings for the reading parameters. The original document reading parameters input screen shown in FIG. 5 is displayed on the display 135, and when the user inputs the recipient, compression format and file name pursuant to the original document reading parameters input screen, the reading parameters are accepted.

Figures 5, 6:
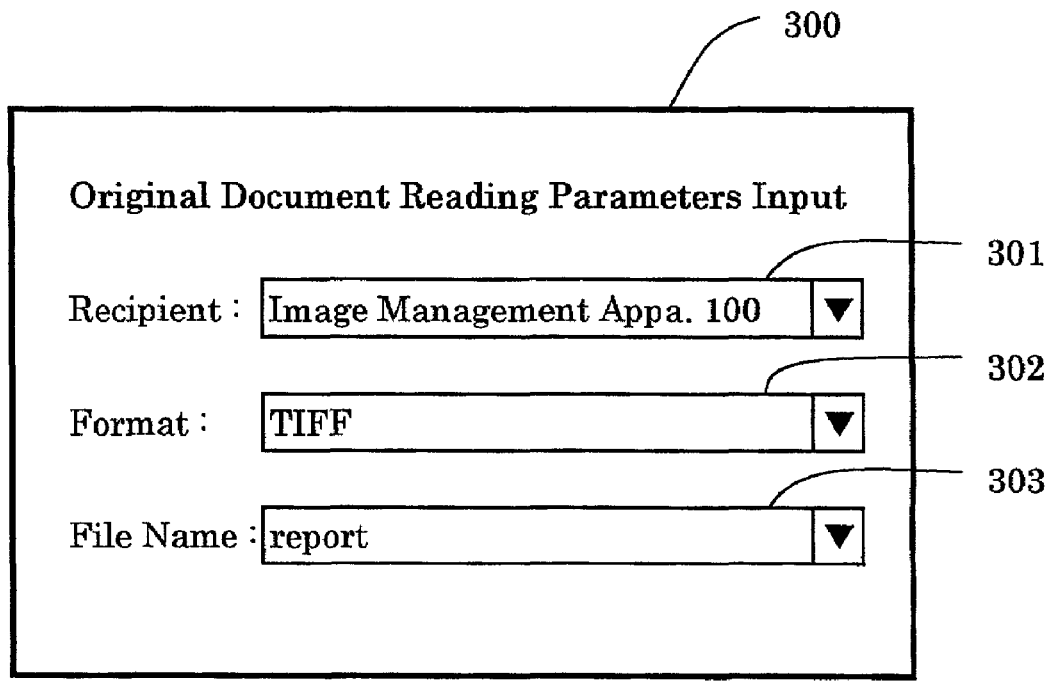
FIG. 5 is a drawing showing one example of the original document reading parameters input screen displayed on the copying machine 101 pertaining to the embodiment.
FIG. 6 is a drawing showing one example of a virtual combination file created by the copying machine 101 pertaining to the embodiment.

FIG. 5 is a drawing showing one example of the original document reading parameters input screen displayed on the display 135 of the copying machine 101 of this embodiment. Referring to FIG. 5, the original document reading parameters input screen 300 includes an area 301 in which is input the recipient, an area 302 in which is input the compression format, and an area 303 in which is input the file name. When the user presses a prescribed key of the input unit 136, the cursor moves to the area 301, 302 or 303. The user inputs data to the area 301, 302 or 303 by selecting the desired choice from among the options displayed in a popup screen that lists the options regarding the data to be input.

For example, in the area 301 in which is input the recipient, the names of the image management apparatuses 100, 100A and 100B are displayed as options. The names and corresponding network addresses for the image management apparatuses 100, 100A and 100B are stored in the fixed storage device 139 of the copying machine 101. The recipient network address is specified based on the name of the image management apparatus input in the area 301 of the original document reading parameters input screen 300.

The format for the compression of the read image data is selected in the area 302 in which is input the compression format. The compression format options include JPEG (Joint Photographic Experts Group), TIFF (Tagged Image File Format) or GIF (Graphic Interchange Format), for example, and the desired compression format is selected from among these options. In the case of TIFF, the multi-page format that generally combines multiple sets of image data (pages) into one file is used.

The name of the virtual combination file, which is described below, is input in the area 303 in which the file name is input. For the virtual combination file name, multiple file names are stored in advance as options, and are displayed in a popup screen such that the user can select one from among them. Alternatively, the user can input a desired character string via the input unit 136.

Returning to FIG. 4, once the input regarding the reading parameters is accepted, it is then determined whether or not the start button of the input unit 136 has been pressed (step S02). If the start button has been pressed, the CPU advances to step S3, while if not, the process of step S01 to accept settings for the reading parameters is repeatedly performed.

In step S03, the compression program to compress the image data using the compression format designated in the reading parameters input acceptance operation of step S01 is read out from the fixed storage device 139. For example, where the TIFF compression format is designated in step S01, the program that compresses the image data using the TIFF format is read out.

In the next step S04, it is determined whether or not there are multiple document sets in the original document that should be associated for management. For this determination, the user may be asked whether or not the original document contains multiple related document sets and the instruction from the user may be accepted, for example. Where the original document contains multiple document sets, the CPU advances to step S05, while if not, the CPU advances to step S18.

In step S05, virtual combination information, which is management information, is created. Virtual combination information is the information that indicates the interrelationship among multiple files that enables such files to be handled virtually as a single file. A virtual combination file name is assigned to this virtual combination information, and the information is stored in the fixed storage device 139. In this embodiment, the file name input in step S01 is used for the file name for the virtual combination file stored in this manner. Therefore, a file having the virtual combination file name 'report' with no extension is created in the fixed storage device 139. The virtual combination information is also information that defines the order of the multiple component files as well as the component file names. The extension of the virtual combination file may be '.txt', for example, and may be determined in advance.

Because the virtual combination information is not yet finalized when step S05 is executed, the created virtual combination file is a file that has zero data.

In step S06, '1' is set to the variable 'cnt'. The value that indicates the ordinal position of the read document set in the original document is set for the variable 'cnt'.

In the next step S07, a component file name is created. Any file name may be specified for the component file name, but in this embodiment, a file name comprising the variable 'cnt', which is expressed in three digits, and having a code that indicates the compression format as the extension, is used. Because the variable 'cnt' is '1' and TIFF was selected as the compression format in step S01, the component file name is deemed '001.tif'. Because a code that indicates the compression format is included in the file name as the extension in this way, the compression format of that file can be determined from the file name.

In the next step S08, virtual combination information regarding the component file is added to the virtual combination file created in step S05. Because the variable 'cnt' is '1' and the component file name is '001.tif', virtual combination information with the ordinal position of '1' and the component file name '001.tif' is added.

In the next step S09, reading of the original document is performed. The reading of the original document is carried out by the image reader 133, and bitmap image data is sent to the image processor 132.

In the next step S10, image compression is carried out by the image processor 132. Because TIFF was selected as the compression format in step S01, the program to compress the image using TIFF, which was read out from the fixed storage device 139, is executed by the image processor 132, and the image data for the original document read in step S09 is compressed.

In the next step S11, the compressed image data is stored in the fixed storage device 139 under the component file name created in step S07. Where multiple pages are included in one document set, steps S09 and S10 are executed for the same number as the pages of the document set, and the multiple sets of image data thus obtained are generated as a single file.

In step S12, it is determined whether or not another document set remains to be read, and if another document exists, the CPU advances to step S13, while if not, the CPU advances to step S12-1. The determination as to whether or not a next document set exists is made based on the detection regarding whether or not a document set resides in the ADF.

In step S13, '1' is added to the variable 'cnt', and the CPU advances to step S07. Thereafter, the operations of steps S07 through S11 are repeatedly performed using the variable 'cnt' to which '1' was added. In this embodiment, the operations of steps S07 through S11 are carried out repeatedly five times to read the five document sets in the original document until a send instruction, which indicates the completion of reading of the original document, is issued, and a virtual combination file 'report' that contains the virtual combination information shown in FIG. 6 is created in the fixed storage device 139.

In step S12-1, it is determined whether or not a send instruction, which means the completion of reading of the original document, is issued. This determination may be made based on a determination as to whether the send button displayed on the touch-panel display or a prescribed key was pressed by the user, for example. If transmission is instructed, the CPU advances to step S14, while if not, the CPU returns to step S12 and determines whether or not there is a next document set.

FIG. 6 is a drawing showing one example of the virtual combination file created by the copying machine 101 in this embodiment. Referring to FIG. 6, the virtual combination file includes virtual combination information having the ordinal position of '1' and a component file name of '001.tif', virtual combination information having the ordinal position of '2' and a component file name of '002.tif', virtual combination information having the ordinal position of '3' and a component file name of '003.tif', virtual combination information having the ordinal position of '4' and a component file name of '004.tif', and virtual combination information having the ordinal position of '5' and a component file name of '005.tif'. Consequently, the virtual combination file is a file that includes sets of virtual combination information that defines the component file name and the ordinal position thereof.

In step S14, the image data is read out from the fixed storage device 139. The image data read out is the image data for the component file names specified by the virtual combination information stored under the virtual combination file having the file name 'report'. The order of the reading is determined based on the virtual combination information. In other words, when step S14 is executed for the first time, the file for the component file name having the first ordinal position is read out, and when it is executed for the second time, the file for the component file name having the second ordinal position is read out. The file for the component file name having the next ordinal position is read out each time step S14 is executed thereafter.

The image data thus read out and the corresponding component file name are sent to the recipient input in step S01 from the NIC 138 (step S15).

In the next step S16, it is determined whether or not all of the sets of image data have been sent, and if it is determined that they have been sent, the CPU advances to step S17, while if not, the CPU advances to step S14. In this embodiment, because five image data files are stored in the fixed storage device 139, steps S14 and S15 are performed five times in succession.

In step S17, the virtual combination file stored in the fixed storage device 139 as having the virtual combination file name 'report' is sent to the recipient input in step S01 from the NIC 138. When this is done, the virtual combination file name is also sent.

On the other hand, where it is determined in step S04 that there are no multiple document sets in the original document, the original document having a single page or multiple pages is read by the image reader 133 (step S18). The image data is then compressed by the image processor 132 in accordance with the compression format input in step S01, and a file name is assigned to the compressed image data. The file name here includes the file name input in step S01 as well as a code that indicates as the extension the compression format used for the compression processing in step S19. For example, where the TIFF compression format is designated and 'report' is input for the file name, the file name 'report.tif' is assigned. Where the original document includes multiple pages, 'report.tif' may be used as a multi-page file. Where the image for each page is deemed one file, such files names as 'report001.tif' and 'report002.tif' are assigned. The compressed image data and the file name assigned in step S20 are sent to the recipient input in step S01 from the NIC 138 in step S21. Where there is only one document set in the original document but the image data is combined into multiple image files, in order to facilitate file management a virtual combination file may be created as the management information as in the same manner as in the situation described above.

Figure 8:
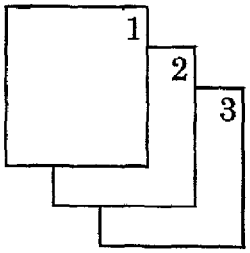
FIG. 8 is an explanatory drawing showing the concept of the image data management pertaining to the embodiment.
Figure 8:
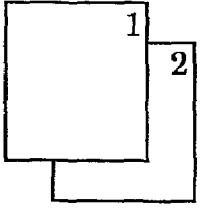
Figure 8:
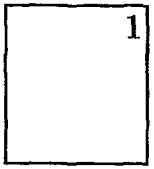
Figure 8:
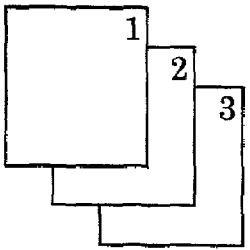
Figure 8:
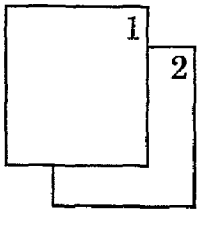

The concept of image data file management in the routine described above is shown in FIG. 8. As shown in the drawing, in the copying machine 101 of this embodiment, a component file name is assigned to each of the multiple sets of image data that are obtained by reading multiple document sets in the original document one at a time, virtual combination information that associates the ordinal position of each document set, which is determined based on the order of reading of the document sets, and the component file name thereof is created, and the multiple sets of compressed image data and the virtual combination information are sent to the image management apparatus, which is the designated recipient. Accordingly, the image management apparatus can receive the compressed image data for each document set. In addition, using the virtual combination information, the order of the received sets of image data may be determined. Furthermore, because image files for document sets that are related to one another can be managed while maintaining such association, the interrelationships among multiple files can be easily understood.

In addition, because the compressed image data includes a code that indicates the compression format as the extension, the image management apparatus that received the image data can determine from the file name the compression format in which the image data is compressed.

Figure 7:
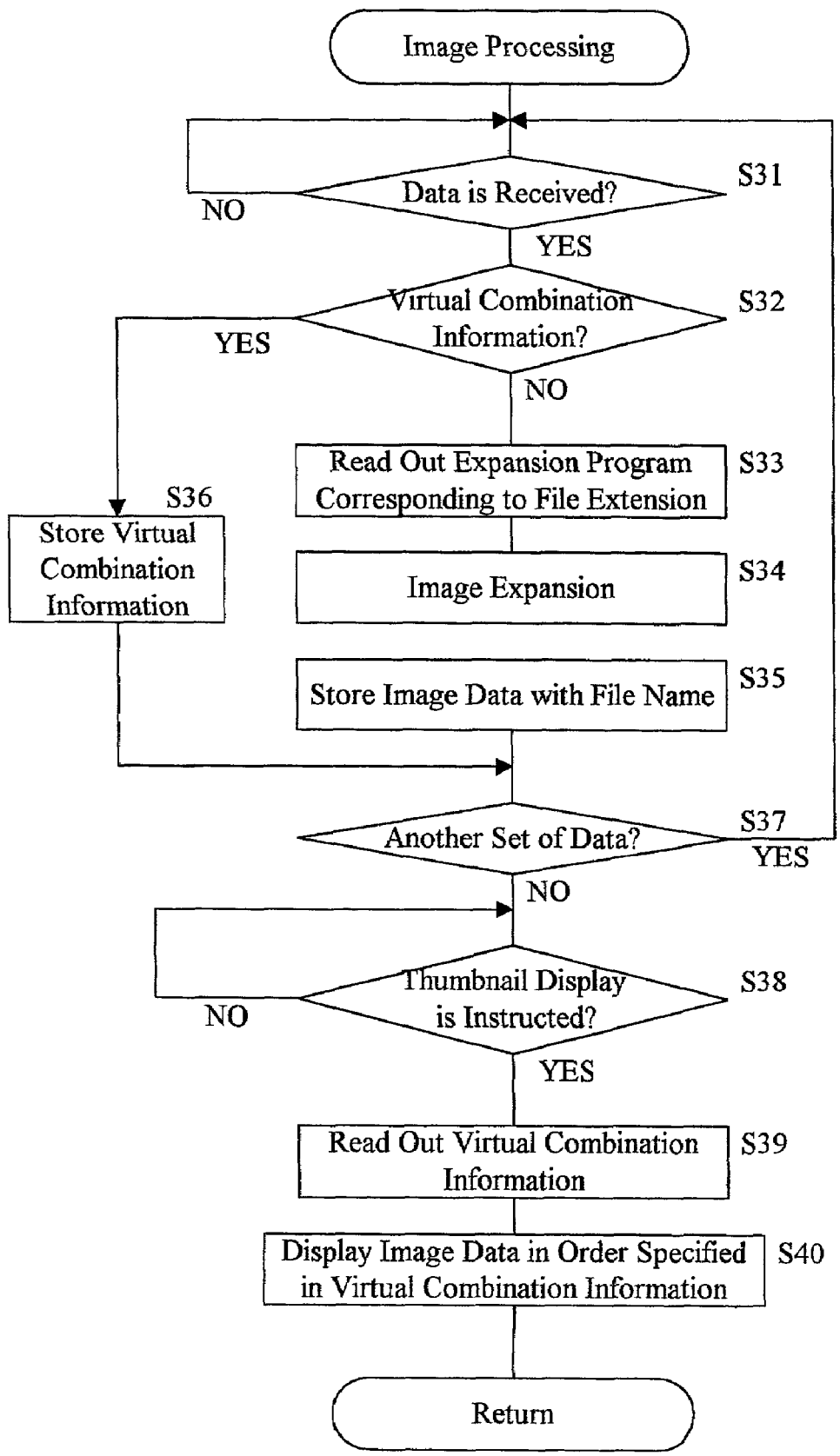
FIG. 7 is a flow chart showing the sequence of the image management processing carried out by the image management apparatus pertaining to the embodiment.

FIG. 7 is a flow chart showing the sequence of the image management routine executed by the image management apparatus 100 of this embodiment. Referring to FIG. 7, in the image management apparatus, it is first determined whether or not data has been received by the NIC 118 (step S31). If data has been received, the CPU advances to step S32, while if not, a standby state is entered. Instead of maintaining the standby state in the data receiving operation of step S31 until data is received, an interrupt may be generated when data is received, such that the operations of steps S32 through S37 are carried out thereafter.

Here, the data received by the NIC 118 includes the image data sent from the copying machine 101 and the corresponding file name, or the virtual combination information and the corresponding file name.

A situation will now be explained in which the image data sent in the original document reading operation explained with reference to FIG. 4 and the corresponding file name, as well as the virtual combination file and the corresponding file name, are received.

In step S32, it is determined whether or not the data received in step S31 is virtual combination information. If the data is determined to be virtual combination information, the CPU advances to step S36, while if not, the CPU advances to step S33. The determination as to whether or not the data is virtual combination information is based on the file name or the file format of the data. For example, if the file name does not have an extension, the data is determined to be virtual combination information. Alternatively, where the file format is the text format, the data is determined to be virtual combination information.

In step S36, the virtual combination information received is stored in the fixed storage device 114. When this is done, the virtual combination file name is also received with the virtual combination information, and the virtual combination information is stored in the fixed storage device 114 as a virtual combination file having the received virtual combination file name. In this embodiment, a virtual combination file having the virtual combination file name 'report' is stored. In other words, virtual combination information identical to the virtual combination file shown in FIG. 6 is stored.

Steps S33 through S35 are the operations that are executed when image data and the corresponding file name are received in step S31. In step S33, the expansion program that corresponds to the extension of the received file name is read out from the fixed storage device 114. In this embodiment, the extension 'tif' is used for the image data compressed using the TIFF compression format. In the case of a file name having the extension 'tif', as in this embodiment, the decoding program to expand the image data compressed using the TIFF format is read out from the fixed storage device 114.

In step S34, the expansion program read out in step S33 is executed with regard to the image data received in step S31. In step S35, the expanded image data is then stored in the fixed storage device 114 under the file name received in step S31.

It is determined in the next step S37 whether or not there is another set of received data, and if another set of received data is determined to exist, the CPU advances to step S31, while if not, the CPU advances to step S38.

In step S31, the next image data and the corresponding file name or virtual combination information and the corresponding file name are received. Where there are multiple sets of image data and corresponding file names, the steps S31 through S35 are executed repeatedly until all of the multiple sets of image data are received.

In step S38, it is determined whether or not a command instructing thumbnail display is input by the user via the keyboard 120 or the mouse 121. If a thumbnail display command is input, the CPU advances to step S39, while if not, the standby state is entered. Instead of maintaining the standby state in step S38 until a thumbnail display command is input, an interrupt may be generated when a thumbnail display command is received, such that the operations of steps S39 through S40 are carried out thereafter.

In step S39, the virtual combination file stored in the fixed storage device 114 is read out. In this embodiment, the virtual combination file having the file name 'report' is read out. This is the same file as the virtual combination file shown in FIG. 6.

In step S40, the image data sets having the component file names are read out from the fixed storage device 114 in the order specified pursuant to the read-out virtual combination information, and the image data sets thus read out are reduced in size and displayed on the display 119 as thumbnail images.

In this embodiment, image data is displayed in accordance with the virtual combination information shown in FIG. 6. Specifically, the order of the image data sets is specified in the order of the file names '001.tif', '002.tif', '003.tif', '004.tif' and '005.tif', and the image data sets are displayed according to this specified order. The image data set having the file name '001.tif' is first displayed on the display 119, and each time page forwarding is instructed via the mouse 121, the image data set having the component file name of the next ordinal position is displayed as a thumbnail image. In this case, the application program to display TIFF files is booted, the image data is read out using the application program, and thumbnails are created and displayed.

Where a multi-page file is displayed as thumbnail images, the first page image may be first displayed as a thumbnail, and the subsequent pages may be displayed each time page forwarding is instructed via the mouse using a page forwarding button. Alternatively, the images for all of the pages may be displayed as thumbnail images together. In this case, display should be performed such that files (document sets) can be distinguished from each other.

In this embodiment, an example in which the image data sets are displayed as thumbnail images in the order specified by the virtual combination information is explained, but the files associated with each other by the virtual combination information may be printed, copied or deleted instead.

An example in which the image file format is a multi-page format has been described so far, but as shown in FIG. 9, the present invention may be applied where the file format is not a multi-page format. In this case, the count value or ordinal position given in each file name comprises a serial number throughout each document set. For example, as shown in FIG. 9, the image files belonging to document set 1 are named '001.tif', '002.tif' and '003.tif', while the image files belonging to document set 2 are named '004.tif' and '005.tif'. In addition, in order to distinguish the image files of one document set from those belonging to the other, identification information is assigned to each file and added to the virtual combination file. For example, identification information 'technical memo' is assigned to each file of document set 1, and identification information 'specifications' is given to each file of document set 2. The image management apparatus 100 that receives this virtual combination file and the image files can process the images for each document set based on the identification information when performing display or printing. By adding identification information to each file in this way, even if a format is used in which each page comprises one file, the files may be easily managed by document set.

In addition, in this embodiment, virtual combination information is sent after image data is sent, but such information may be sent before image data is sent. In other words, a communication protocol may be determined for the communication between the copying machine 101 and the image management apparatus 100, such that data is transmitted and received using the specified communication protocol. In this embodiment, data is sent to the image management apparatus 100 at any time from the copying machine 101, but the communication protocol may be such that transmission must be requested by the image management apparatus 100 from the copying machine 101.

In addition, in this embodiment, the copying machine 101 and the image management apparatus 100 are connected over the LAN 103, but the copying machine 101 and the image management apparatus 100 may be connected on a one-on-one basis.

Furthermore, in this embodiment, image data and management information (virtual combination information) are sent via the NIC 138 of the copying machine 101, but such transmission may be carried out using a different interface.

Moreover, the virtual combination file name is input from the original document reading parameters input screen 300, but a file name predetermined by the copying machine 101 may be used instead. In this case, it is not necessary to input a virtual combination file name from the original document reading parameters input screen 300.

As described above, in the file management system of this embodiment, when a multi-page original document is divided into multiple document sets and then read by the copying machine 101, because an image data file is created for each document set, and the image management apparatus 100, which receives the image data, receives not only the image data but also virtual combination information that indicates the interrelationships among the image data files, the received multiple image data files can be managed pursuant to a specified order. Accordingly, where multiple image data sets are stored in the fixed storage device 114 as multiple files, multiple image files that are associated with one another can be managed as if they comprised a single file. Moreover, where original document image data for one page is handled as one file, because virtual combination information that includes identification information for each file is generated, image file management by document set and overall image file management become easy.

A file management system 1 is explained in this embodiment, but the present invention may be understood as a method for executing the routines shown in FIG. 4 or FIG. 7, or as a program that causes a computer to execute the routines shown in FIG. 4 or FIG. 7. Such a program is stored in the recording medium 122 or 140, and when it is read by the external storage device 115 or 137, it can be executed by the CPU 111 or the controller 131.

The embodiment disclosed herein is an example in all aspects thereof, and should not be considered as limiting the application of the present invention in any way. The scope of the present invention is indicated not by the description provided above but by the claims, and it is intended that all modifications within the meaning and scope of the claims are included.

What is claimed is:

1. An image reading apparatus, comprising:
   an image reader for reading a multi-page original document and obtaining multiple sets of image data;
   a determining device for determining whether an original document has multiple pages;
   a file creating portion for creating multiple image data files from the obtained image data sets, each of the created image data files being recognized as a separate image data file in an external apparatus which receives the multiple image data files;
   a management information creating portion for creating management information to treat the multiple image data files as a single virtual file in the external apparatus, the created management information indicating interrelationships among the multiple image data files for the multi-page original document;
   a first transmission portion for separately sending each multiple image data file successively to the external apparatus; and
   a second transmission portion for sending the management information to the external apparatus.

2. The image reading apparatus according to claim 1, wherein the management information includes order information that specifies the order of the multiple image data files.

3. The image reading apparatus according to claim 2, wherein the order information is determined in accordance with an order of reading by the image reader.

4. The image reading apparatus according to claim 2, further comprising:
an identification information adding portion for adding identification information by which to identify the obtained multiple image data files, and wherein the first transmission portion sends to multiple image data files and the added identification information while associating them with teach other, and the management information is information that associates the identification information and the order information.

5. The image reading apparatus according to claim 1, further comprising
an input accepting portion for receiving an input of format information by which to process the obtained multiple image data; and
a data processing portion for processing the obtained multiple image data in accordance with the received processing format, and
wherein the management information includes the received processing format information.

6. An image transmission method, comprising steps of:
reading a multi-page original document and obtaining multiple sets of image data;
determining whether an original document has multiple pages;
creating multiple image data files from the obtained image data sets, each of the created image data files being recognized as a separate image data file in an external apparatus which receives the multiple image data files;
creating management information to treat the multiple image data files as a single virtual file in the external apparatus, the created management information indicating interrelationships among the multiple image data files for the multi-page original document;
separately sending each multiple image data file successively to the external apparatus; and
sending the management information to the external apparatus.

7. An image transmission program stored in a computer readable medium that causes an image reading apparatus to execute:
reading a multi-page original document and obtaining multiple sets of image data;
determining whether an original document has multiple pages;
creating multiple image data files from the obtained image data sets, each of the created image data files being recognized as a separate image data file in an external apparatus which receives the multiple image data files;
creating management information to treat the multiple image data files as a single virtual file in the external apparatus, the created management information indicating interrelationships among the multiple image data files for the multi-page original document;
separately sending each multiple image data file successively to the external apparatus; and
sending the management information to the external apparatus.

8. An image management apparatus, comprising:
a first receiving portion for receiving multiple image data files separately;
a second receiving portion for receiving management information to treat the multiple image data files as a single virtual file, the received management information indicating interrelationships among the multiple image data files as a single document containing multiple pages; and
a data processing portion for processing the received multiple image data files in accordance with the received management information, wherein the received multiple image data files are separate files.

9. The image management apparatus according to claim 8, wherein the management information includes order information that defines order of the multiple image data files.

10. The image management apparatus according to claim 9, wherein the management information is information that associates identification information by which to identify each of the multiple image data files and the order information, and the first receiving portion receives identification information that corresponds to the received image data file when receiving each of the multiple sets of image data.

11. An image management method, comprising steps of:
receiving multiple image data files separately;
receiving management information to treat the multiple image data files as a single virtual file, the received management information indicating interrelationships among the multiple image data files as a single document containing multiple pages; and
processing the received multiple image data files in accordance with the received management information, wherein the received multiple image files are separate files.

12. An image management program stored in a computer readable medium that causes a computer to execute:
receiving multiple image data files separately;
receiving management information to treat the multiple image data files as a single virtual file, the received management information indicating interrelationships among the multiple image data files as a single document containing multiple pages; and
processing the received multiple image data files in accordance with the received management information, wherein the received multiple image data files are separate files.

* * * * *